United States Patent [19]

Baumann et al.

[11] Patent Number: 4,489,175

[45] Date of Patent: Dec. 18, 1984

[54] METHOD OF PRODUCING A UREA FORMALDEHYDE COMBINATION FOAM WITH A LOW CONTENT OF FORMALDEHYDE

[75] Inventors: Heinz Baumann, Kleinniedesheim; Rembert Baumann, Mannheim, both of Fed. Rep. of Germany

[73] Assignee: Schaum-Chemie W. Bauer GmbH & Co KG, Fed. Rep. of Germany

[21] Appl. No.: 489,556

[22] Filed: Apr. 28, 1983

[30] Foreign Application Priority Data

May 6, 1982 [DE] Fed. Rep. of Germany ....... 3216897

[51] Int. Cl.³ ................................................ C08J 9/30
[52] U.S. Cl. ..................................... 521/116; 521/121; 521/188; 528/259; 528/260
[58] Field of Search ...................... 521/188, 116, 121; 528/260, 259

[56] References Cited

U.S. PATENT DOCUMENTS

| | | | |
|---|---|---|---|
| 2,559,891 | 7/1951 | Meyer | 521/188 |
| 3,231,525 | 1/1966 | Kelly et al. | 521/128 |
| 4,092,277 | 5/1978 | Moore | 521/188 |
| 4,225,680 | 9/1980 | Williams | 521/188 |

*Primary Examiner*—Morton Foelak
*Attorney, Agent, or Firm*—Keil & Weinkauf

[57] ABSTRACT

To obtain a UF foam which is low in formaldehyde, yet is dimensionally stable, up to 96% urea is dissolved in an approximately 10 to 30% aqueous extract of an alkyl, aryl or alkaryl sulphonic acid, said solution being mixed with a conventional hardener/foaming agent solution containing the sodium salt of an alkyl, aryl or alkaryl sulphonic acid in an aqueous diluent usually employed for foaming, in a ratio sulphonic acid solution to sodium sulphonate solution of 1:1 to 1:4, the pH value being adjusted to 0 up to 3 and said mixture being foamed together with a urea formaldehyde resin precondensate solution in the usual manner.

6 Claims, No Drawings

METHOD OF PRODUCING A UREA FORMALDEHYDE COMBINATION FOAM WITH A LOW CONTENT OF FORMALDEHYDE

The invention relates to a method of producing a urea formaldehyde combination foam with a low content of formaldehyde by foaming a solution of a urea formaldehyde resin precondensate with a hardener/foaming agent solution.

It is common practice to continuously produce foamy substances for the various fields of application by foaming aqueous solutions of hardenable urea formaldehyde resin precondensates in that the aqueous solution of a foaming agent containing a hardener is foamed by means of compressed air and this foam is mixed in a mixing chamber with the urea formaldehyde precondensate likewise fed by means of compressed air, and dispatching this foam to any place where it is used.

Combination foam is obtained by adding at least 10% solid components in the foaming agent, e.g., a foam that has been obtained by foaming a 40% resin precondensate and a foaming agent containing at least 10% solid matter.

In the so-called "resin expansion" [H. Baumann, "Expanded Isofoam In The Melting Crucible Of Practice", Heizung-Lüftung-Haustechnik 19 (1967) 17] resin and surfactant powder are solved in water and the hardener is fed separately to the apparatus.

The fields of application are described in the literature (H. Baumann "Further Developments In The Field Of Urea Formaldehyde Resin Foams", Kunststoff 47 (1957) 256–259. Engl. Kunststoffe German Plastics Vol. 48, August (1958); same author "Production and Processing of UF Expanded Plastics—New Scientific And Technical Information", Plastverarbeiter (1976), Vol. 5; same author, "Progress in UF Expanded Plastics—New Polycondensates And Expanded Plastics", Kunststoffe 69 (1979) Vol. 8, Engl. Kunststoffe German Plastics 11/81; C. J. Benning, "Plastic Foams", Wiley and Sons, New York, (1969); K. C. Frisch and J. H. Sounders, "Plastic Foams", Marcel Dekker Inc., New York, (1973); B. Meyer "Urea-Formaldehyde Resins"; Addison-Wesley Publishing Co., Massachusetts (1979).

The expressions "urea formaldehyde" and "UF" are used interchangeably hereinafter.

The UF foamed plastics have many advantages over other insulation materials. For example, they are made from aqueous solutions and do not depend on petroleum. In case of a fire they do not contribute to the spreading of the fire and are reasonably priced. 40 liters basic solution, e.g., 20 liters resin solution and 20 liters foaming agent yield 1000 liters ready foam. Expensive warehousing, for example, of dishes, as well high insurance costs are dispensed with. They pertain to the insulating materials that meet the economic requirements.

During the drying out period, which in the case of commercial foams can last up to 28 days depending on the ambient temperature and on the atmospheric humidity, the UF foamed plastics give off to the air small quantities of formaldehyde solved in the water, and also depending on short-chain methylol-containing groups which can convert into formaldehyde. This leads to nasal nuisance.

In the United States, formaldehyde freed from foamed plastics are deemed by the CPSC (Consumer Product Safety Commission) to be harmful to one's health.

As early as 1939, it was proposed to eliminate the residual formaldehyde in the UF foam through the use of alcohols (German Patent No. 729 029). A further reduction of formaldehyde, however small, is achieved by the addition of alcohols with 4 or more hydroxyl groups to the resin (German Patent No. 1 054 232).

It has long been common practice to add about 15% urea to liquefied resins, and usually about 12% to powdery resins (Technische Information der BASF, September 1981), adding additional percentages of urea in the resin leads to an easing of the compressive strength and to a tendency of the UF foam toward abrasion.

Attempts have also been made to add relatively large quantities of urea to the foaming agent solutions used for the production of UF foams and which usually contain as foaming agent salts, more particularly sodium salts of aryl, alkyl, or alkaryl sulphonic acids, but this resulted in turbidity or precipitation of the urea and led to an easing of the compressive strength and to a tendency of the UF foam toward abrasion.

As an example, if urea is added to a sodium sulphonate/foaming agent solution, 7 g/l (0.12 mole) can be introduced at 18° C. and 15 g/l (0.25 mole) at 25° C. These small quantities have, however, no significant influence on the binding of the formaldehyde. If larger quantities of urea are added to the sodium/sulphonate solution, turbidities occur and, for example, after 24 hours even precipitations. These were chromatographically, and correctly, identified as urea. Turbidity, however, is temperature dependent; it can temporarily disappear in part and can be solved in ammonia, amylmethylketone, dimethylformaldehyde, dioxan, acetic acid, furfuryl alcohol, glycol, resorcinol, etc., but the foamability of the foaming agent is obliterated.

The weakly basic character of urea further changes the pH value of the sodium surfactant solution and must later be reestablished with acid, causing urea that has gone into solution to be precipitated.

U.S. Pat. No. 3,231,525 attempted to solve this problem by using, instead of the sodium salt of a sulphonic acid in the hardener/foaming agent solution, the acid itself. In this case, although substantially larger quantities of urea could be solved in the foaming agent solution, the resulting foams were not dimensionally stable but shrunk and did not satisfy the technical standard with respect to hydrothermal loading.

Thus far, all attempts to eliminate the residual formaldehyde in foaming agents have not been satisfactory because either the desired elimination was not sufficient, or products were obtained that were unsatisfactory in terms of dimensional stability, crack growth, or flameproofness.

Further attempts have been made to greatly enhance the physical and/or chemical properties of the ready UF foam, and descriptions are found in the literature of, e.g., stabilizers, reaction accelerators, additives, loading materials, additive fillers, plasticizers, etc. However, these attempts have remained without major significance.

The object of the invention is to introduce larger quantities of urea into the foaming agent in order to obtain a UF foam with less release of formaldehyde and faster drying-out time, but which is dimensionally stable, free from cracks, strong in compression, fireproof and resistant to abrasion, that is to say, which in its overall properties satisfies the technical standard.

This object is achieved by the invention by dissolving up to 96% urea in an approximately 10 to 30% aqueous extract of an alkyl, aryl or alkaryl sulphonic acid, mixing this solution with a conventional hardener/foaming agent solution containing the sodium salt of an alkyl, aryl, or alkaryl sulphonic acid in an aqueous diluent which is usually used for the foaming in a ratio sulphonic acid solution to sodium sulphonate solution of 1:1 to 1:4, adjusting the pH value to 0 up to 3 and foaming this mixture together with a urea formaldehyde resin precondensate solution in the usual manner.

It has surprisingly been found that the urea dissolved in larger quantities in a sulphonic acid extract precipitated no longer by the addition of a diluted sodium/sulphonate foaming agent solution.

Thus, on the one hand larger quantities of urea can be dissolved in the sulphonic acid extract sufficient to eliminate residual formaldehyde to the largest extent possible and, on the other hand, a quantity of sodium/sulphonate foaming agent solution can be added to the insufficiently foam-producing urea/sulphonic acid to achieve adequate frothing without causing the dissolved urea to be precipitated again.

The anionic foaming agents suitable for the production of UF foams, also called surfactants, substances with surface-active properties, "surface-active" substances, or "detergents", mainly based on aryl and alkyl sulphonic acid salts, are described in detail, among others, by K. Lindner, "Surfactants", three volumes, Wissenschaftliche Verlagsanstalt mbH, Stuttgart (1964); volume 3 appeared in 1971; G. Jawalek "Surfactants", Akademie Verlag, Berlin (1975); H. Stache "Surfactant Handbook", Hanser-Verlag, Munich (1979); and in the printed publications and bulletins of the manufacturers.

The isopropylnaphthalene sulphonates are better wetting agents than the monopropyl ones. They are reinforced usually by introducing two butyl radicals into the naphthalene core. The isobutyl radical is, for example, preferred to the N-butyl radical. The branching in the hydrocarbon skeleton has a favorable effect on the wettability and strengthens the bulky structure of the molecules. For example, diisobutylnaphthalene sulphonic acidic sodium is preferred as foaming agent.

By way of example, a foaming agent solution ready for splashing consists of 20% diisobutylnaphthalene sulphonic acidic sodium, 4% resorcinol, 25% 85% $H_3PO_4$ and 51% softened water. 45 ml of this extract is added to 956 ml water to obtain the solution used for the foaming.

Urea formaldehyde precondensates(aminoplastics) has been described many times in the literature [Beat Meyer "Urea Formaldehyde Resins:" (1979), Addison-Wesley Publishing Company, Inc.]. However, only resins with special formulas are suitable for the production of UF foams. Glutinous resins, for example, result in foams that are not water-resistant and the ready foam may lead to fungus formation.

According to the invention, a 40% aqueous urea formaldehyde resin precondensate prepared at 100° C. in the known manner from urea and formaldehyde in the molar ratio 1:1.2, which has been neutralized with NaOH to a pH value of 7.0 and cooled to room temperature, is particularly suitable.

In principle, all acids whose sodium salts are described in the literature as foaming agents are suitable for use in accordance with the teachings of the invention as alkyl, aryl, and alkaryl sulphonic acids. The diisobutyl napththalene sulphonic acids and the dodecylbenzol sulphonic acids and their mixture have proved to be particularly suitable. However, all other alkyl, aryl, and alkaryl sulphonic acids are likewise suitable, either alone or mixed.

All alkyl and aryl ureas can be used as urea, e.g., monoalkyl-monoaryl ureas, dialkyl-diaryl ureas, trialkyl-triaryl ureas, tetraalkyl ureas and the derivatives of isourea.

Instead of urea, thiourea can also be utilized which, however, is described in the literature as carcenogenic and whose condensation reactions of the urea are known. It has the advantage of being soluble in large quantities without turbidity even with the addition of relatively large quantities of the sodium sulphonate/foaming agent solution. It can also be combined with urea.

The pH value of the solution to be foamed lies between 0 and 3. Very favorable results are obtained with a pH value of 1.3 at 10° C.

Any suitable acid or acidic salt can be used for adjusting the pH value of the solution to be foamed. $H_3PO_4$ and $H_2SO_4$ are preferred. For economic reasons, $H_2SO_4$ is particularly preferred because, for example, when using 85% $H_2SO_4$, the required quantity would be only 1/5 of the quantity that would be required with 85% $H_3PO_4$.

A known fact is the fluctuating cure of the UF foam at relatively high or low outside temperatures through careful compliance with the setting times of the ready foam. These depend on the pH value.

The exact measurements of the various pH values of the surfactants used for the foaming as a function of the temperature are shown in Table I. Based on the values found, it appears appropriate to carry out all formulations at the same resin and foam temperatures because the variations in the pH of a surfactant are greater than in a resin (Cf. Table).

TABLE I

| pH values of the extracts and foam solutions as a function of the temperature | | | | | | |
|---|---|---|---|---|---|---|
| Mixing Ratio Extract/Water/mo | Sodium-Surfactant Extract/1 | | | Acid-Surfactant Exctract + 850 g Urea | | |
| Extrakt/Wasser/ml | 10° C. | 20° C. | 30° C. | 10° C. | 20° C. | 30° C. |
| 900:100 | 0,20 | −0,01 | −0,18 | 2,15 | 2,23 | 2,18 |
| 800:200 | 0,29 | 0,14 | −0,03 | 2,07 | 2,17 | 2,10 |
| 700:300 | 0,42 | 0,27 | 0,07 | 1,98 | 2,09 | 2,01 |
| 600:400 | 0,60 | 0,34 | 0,25 | 1,85 | 1,99 | 2,00 |
| 500:500 | 0,64 | 0,49 | 0,32 | 1,75 | 1,91 | 1,80 |
| 400:600 | 0,70 | 0,62 | 0,45 | 1,68 | 1,83 | 1,76 |
| 300:700 | 0,79 | 0,73 | 0,55 | 1,60 | 1,77 | 1,75 |
| 200:800 | 0,85 | 0,83 | 0,56 | 1,94 | 1,68 | 1,74 |
| 100:900 | 1,14 | 0,93 | 0,67 | 1,95 | 1,57 | 1,73 |
| Extract/Water | Sodium-surfactant Solution/1 | | | Acid-Surfactant Solution + 850 g urea | | |
| ml | 10° C. | 20° C. | 30° C. | 10° C. | 20° C. | 30° C. |
| 30:970 | 1,23 | 1,21 | 1,09 | 1,49 | 1,75 | 1,70 |

TABLE I-continued

| pH values of the extracts and foam solutions as a function of the temperature | | | | | | |
|---|---|---|---|---|---|---|
| 40:960 | 1,11 | 1,10 | 1,00 | 1,47 | 1,72 | 1,60 |
| 50:950 | 1,08 | 1,05 | 0,92 | 1,44 | 1,66 | 1,53 |
| 60:940 | 0,99 | 0,92 | 0,90 | 1,43 | 1,60 | 1,51 |

| ph Value of a Commercial Resin | | | |
|---|---|---|---|
| 10° C. | 15° C. | 20° C. | 30° C. |
| 7,60 | 7,57 | 7,55 | 7,50 |

The invention can be applied both to the so-called "foam expansion" and to "resin expansion" or to prior art equipment to which the components are individually fed and then foamed (Cf. H. Baumann, "Expanded Isofoam In The Melting Crucible Of Practice", Heizung-Lüftung-Haustechnik 18 (1967), pp. 17-18, as well as Urea-Formaldehyde Resins, p. 192).

According to the invention, up to 96% urea can be dissolved in a sulphonic acid extract.

The quantity of urea to be added depends on the reactive formaldehyde or on the formaldehyde from reactive methylol compounds that can be calculated from each commercial resin or can be determined empirically.

Should a foamable surfactant solution which, for example, has been prepared at low temperatures, lead to an undesired turbidity, this will disappear upon heating. If this is not possible, it will be permanently dissolved by equivalent quantities of resorcinol.

Although foams can be obtained that are almost completely shrinkproof by adding to the UF resin polyethylene glycols, e.g., diethylene glycol, diethylene glycol, this will impair the flame resistance. During the hydrythermal treatment of a foam specimen, it was found that diethylene glycol forms cyclic reaction products with the carbon compounds.

It has surprisingly been found that by the addition of polyethylene glycols to render the foamed plastics produced in accordance with the teachings of the invention more shrinkproof, this will practically not impair their flame resistance, unlike the conventional foamed plastics that are only foamed with sulphonates.

The examples below serve to explain the invention further.

EXAMPLE 1

960 g (16 moles) urea was dissolved in 1 liter of a 20% aqueous extract of dodecylbenzol sulphonic acid. Then, a foaming agent solution was prepared by diluting with water to 1 liter 45 ml of an extract comprising 20% diisobutylnaphthalene sulphonic acidic sodium, 4% resorcinol, 25% $H_3PO_4$ and 51% softened water. 200 ml of the sulphonic acid/urea extract was mixed with 800 ml of the sodium sulphonate solution. No urea was precipitated. This means that 192 g=19.2% or 3.2 moles of urea were absorbed by 1 liter foaming agent solution, which is 12.8 times the molar quantity of that which absorbs a sodium/sulphonate foaming agent solution at 25° C.

EXAMPLE 2

The same procedure as in Example 1, but 300 ml of the extract of sulphonic acid and urea and 700 ml of the sodium sulphonate solution were used, with no precipitation of urea. This means that 288 g urea=28.8% or 4.8 moles of urea were absorbed by 1 liter foaming agent solution.

EXAMPLE 3

The same procedure as in Example 1, the difference being that diisobutylnaphthalene sulphonic acid was used as sulphonic acid. The same result as in Example 1.

EXAMPLE 4

The same procedure as in Example 2, the difference being that diisobutylnaphthalene sulphonic acid was used as sulphonic acid. Same result as in Example 2.

EXAMPLE 5

A commercial 40% aqueous urea formaldehyde resin precondensate solution, which had been prepared by causing urea and formaldehyde in the molar ratio 1:1.2 to react in the known manner at 100° C., adjusting it with NaOH to a pH value of 7.0 and cooling it to room temperature, was treated with 80 ml sorbitol and 80 ml diethylene glycol and foamed with the foaming agent-/urea mixture produced in accordance with Example 1 in the ratio foaming agent to resin of 1.7:2.

After 11 days, the residual formaldehyde measured with a 0.5 Dräger tube was 0.5 ppm; fp=199°–210° C. If a 5×5×5 cm foam cube is subjected at 80° C. and nearly 100% relative humidity to a hydrothermal treatment for more than 3 hours, the volume and weight loss of the reactant gives information about the stability of the ready foam. Prolonging the treatment yields no other values. Also, after three hours there is no further separation of formaldehyde. The volume and weight losses for various formulations can be seen in Table II.

CONTROL SAMPLE 6

(Vergleichsbeispiel 6)

Same procedure as in Example 5, the difference being that the resin precondensate solution was treated only with 80 ml sorbitol and that only the sodium sulphonate solution was used as foaming agent. After 11 days, the residual formaldehyde was 1.5 pp, fp: 217° to 218° C. The foam properties after hydrothermal treatment are shown in Table II.

TABLE II

| Hydrothermal Treatment 80° C./100% Atmospheric Humidity* | | | |
|---|---|---|---|
| Days after foam production | Decrease in volume and weight in % | | |
| | Control sample 6 Volume/Weight | | Example 5 Volume/Weight |
| 2 | 17.00 | 9.52 | 13.36 | 6.63 |
| 3 | 16.70 | 8.00 | 13.37 | 6.58 |
| 4 | 15.80 | 10.50 | 13.90 | 5.59 |
| 7 | 14.70 | 12.60 | 13.73 | 6.60 |
| 8 | 13.50 | 9.00 | 13.20 | 2.30 |
| 9 | 12.29 | 8.40 | 13.40 | 2.50 |
| 10 | 11.50 | 8.60 | 11.50 | 2.00 |
| 11 | 13.40 | 8.00 | 7.90 | 1.90 |

*Immediately thereafter dried at 105° C. for 30 minutes, and the weight was determined after 30-minute storage at room temperature. (23° C. and 44% relative atmospheric humidity).

CONTROL TEST 7

(Vergleichsversuch 7)

Same procedure as in Example 5, using a foaming agent/urea mixture which differed from that of Example 1 in that diisobutylnaphthalene sulphonic acid was used instead of diisobutylnaphthalene sulphonic acidic sodium.

The resulting precondensate/foaming agent mixture could not be splashed as foam at all.

As apparent from Examples 5, 6 and 7 and the values shown in Table II, according to the invention, excellent dimensionally stable foams can be made with a very small quantity of residual formaldehyde, whereas, if only a sodium sulphonate is used as foaming agent, products can be obtained with a substantially higher residual formaldehyde content whose properties after hydrothermal treatment are furthermore worse than those of the products made in accordance with the teachings of the invention.

If only sulphonic acid is used as foaming agent as described in U.S. Pat. No. 3,231,525, no foams at all can be splashed.

We claim:

1. A method for producing a urea formaldehyde combination foam which is low in formaldehyde by foaming a solution of a urea formaldehyde resin precondensate with a hardener/foaming agent solution, characterized by dissolving up to 960 g urea per liter of aqueous extract comprising approximately 10% to 30% alkyl, aryl or alkaryl sulphonic acid, mixing said solution with a conventional hardener/foaming agent solution containing the sodium salt of an alkyl, aryl or alkaryl sulphonic acid in an aqueous diluent, in a ratio of sulphonic acid solution to sodium sulphonate solution of 1:1 to 1:4, adjusting the pH value to from 0 to 3, and foaming said mixture together with a urea-formaldehyde resin precondensate solution in the conventional manner.

2. The method according to claim 1, characterized in that diisobutylnaphthalene sulphonic acid or dodecylbenzol sulphonic acid is used as sulphonic acid.

3. The method according to claim 1, characterized in that the pH value is adjusted to 1.3 at 10° C.

4. The method according to claim 3, characterized in that $H_2SO_4$ or $H_3PO_4$ is used to adjust the pH value.

5. The method according to claim 1, characterized in that an alcohol with 4 or more hydroxol groups and polyethylene glycol is added to the resin solution prior to foaming.

6. The method according to claim 5, characterized in that 750 ml of the urea formaldehyde resin precondensate, to which 110 ml of an alcohol with 4 or more hydroxol groups and 140 ml of a polyethylene glycol have been added, is foamed with a mixture of 800 ml of a 1.1% aqueous solution of the sodium sulphonate and 200 ml of a 20% solution of the sulphonic acid containing 900 g urea.

* * * * *